June 12, 1956  L. L. BURNS, JR., ET AL  2,750,567
MECHANICAL RESONATOR TERMINATION
Filed March 15, 1952  3 Sheets-Sheet 2
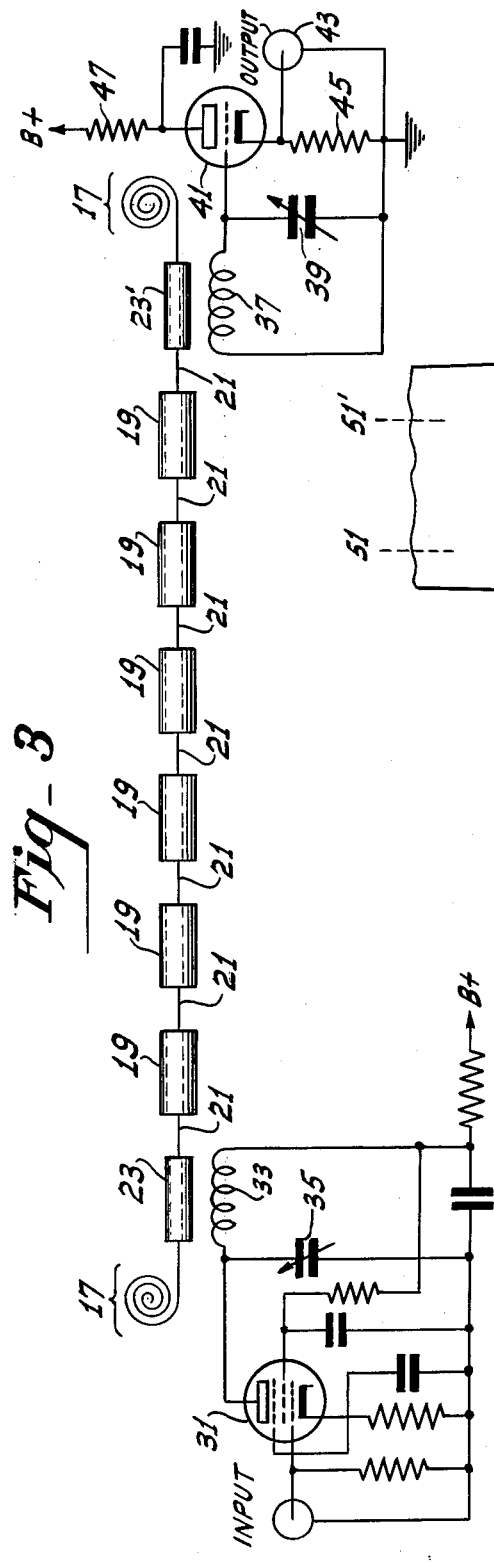
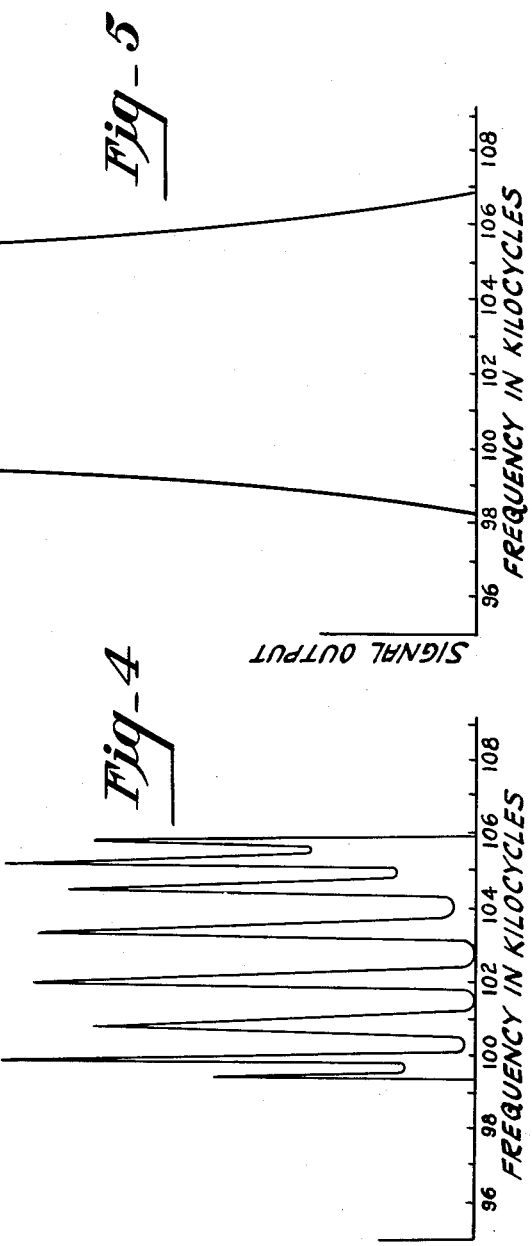
INVENTORS
LESLIE L. BURNS, JR. AND
WALTER VAN B. ROBERTS
BY
Charles H. Brown
ATTORNEY June 12, 1956  L. L. BURNS, JR., ET AL  2,750,567
MECHANICAL RESONATOR TERMINATION
Filed March 15, 1952  3 Sheets-Sheet 3
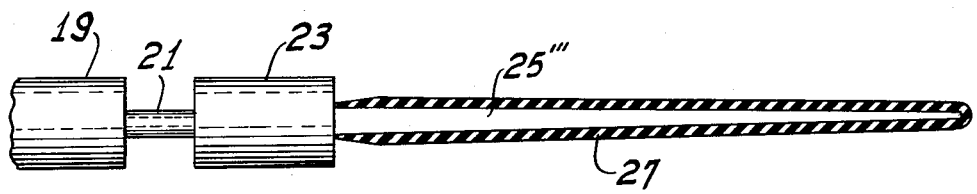
*Fig_8*
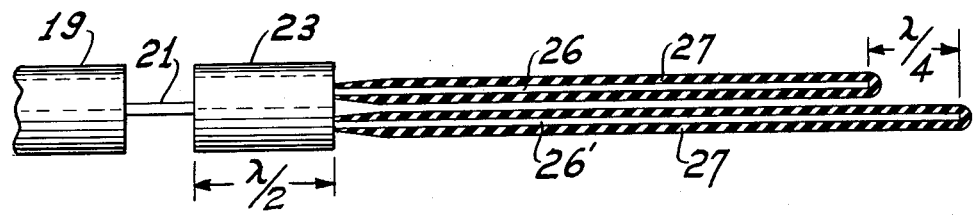
*Fig_9*
INVENTORS
LESLIE L. BURNS, JR. AND
WALTER VAN B. ROBERTS
BY
Charles H. Brown
ATTORNEY United States Patent Office 2,750,567
Patented June 12, 1956

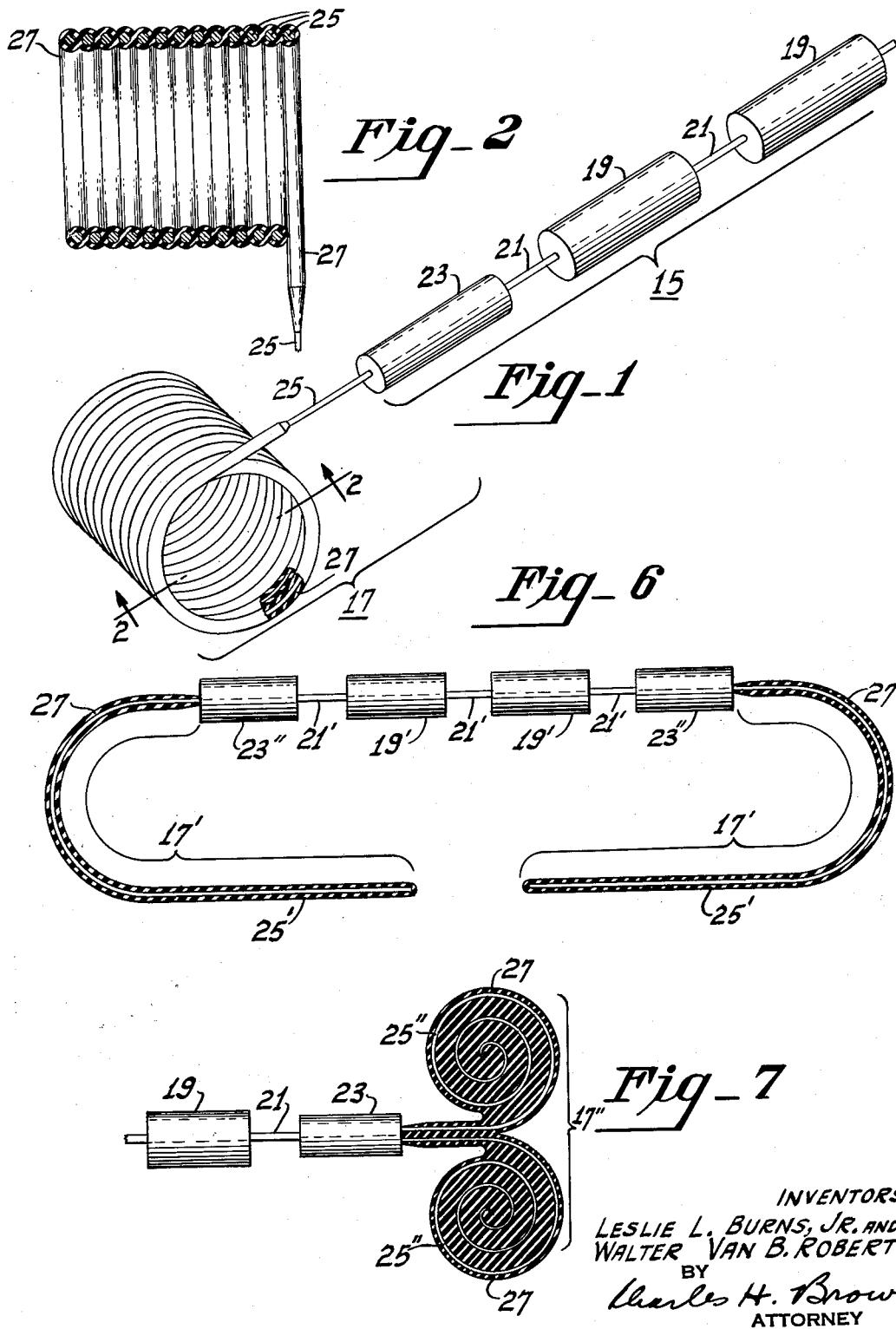

2,750,567

MECHANICAL RESONATOR TERMINATION

Leslie L. Burns, Jr., and Walter van Braam Roberts, Princeton, N. J., assignors to Radio Corporation of America, a corporation of Delaware Application March 15, 1952, Serial No. 276,892

15 Claims. (Cl. 333—71)

This invention relates to mechanical resonators and particularly to mechanical terminations for such resonators.

When mechanical resonators are utilized to couple together portions of an electrical circuit, for example, in bandpass mechanical filters, certain mechanical damping becomes necessary. This necessity for mechanical damping arises from the imperfection of the conversion from mechanical to electrical energy in the vibrating system. The vibratory energy in a terminal filter section which is not absorbed by the loading of the electrical circuit is mechanically reflected and interferes with the desired response at certain frequencies within the passband of the filter. The proper amount of damping will smooth out the response of the filter within the passband.

An object of this invention is to provide an improved and efficient damping termination for a mechanical resonator effective over a band of frequencies.

Another object of this invention is to provide a mechanical termination for a mechanical resonator which is compact, simple, and inexpensive to manufacture.

A further object of this invention is to provide a mechanical damping device whose proportions are comparable to those of the mechanical resonating element to which it is attached, and whose characteristic mechanical impedance has the value to properly terminate the mechanical resonating element.

In accordance with the present invention, there is provided a termination for mechanical resonators which comprises a lossy line whose characteristic mechanical impedance is that necessary to terminate the resonator for the particular application desired. The termination is composed of a finite length of mechanically coupled line whose characteristic mechanical impedance is of the proper value. To insert the damping losses into the finite length of line, a coating of lossy material is placed over a greater portion of its length. This coating has a high acoustic or vibratory loss to absorb and damp the mechanical vibrations therein, and may comprise a natural or synthetic rubber compound, plastic or viscous substances. The lossy line may be coiled into a helix, spiral, or other convenient compact shape without disturbing the damping properties. The mechanical line itself may consist of a plurality of strands to achieve a greater amount of damping per unit length.

A more detailed description follows in conjunction with the accompanying drawings, in which:

Fig. 1 shows a perspective view of a mechanical filter termination according to the present invention;

Fig. 2 is a cross-sectional view taken along the line 2—2 of Fig. 1;

Fig. 3 illustrates schematically a circuit arrangement with which the mechanical resonator termination of the present invention may be utilized;

Fig. 4 illustrates a response for a multisection unterminated mechanical filter;

Fig. 5 illustrates the response curve of the same mechanical resonator properly terminated by the lossy line of this invention;

Fig. 6 shows an alternative arrangement of the lossy line termination of this invention;

Fig. 7 shows another alternative arrangement of the lossy line termination of this invention;

Fig. 8 shows another alternative arrangement of the lossy line termination of this invention; and Fig. 9 shows an alternative arrangement for a finite lossy line termination according to this arrangement.

Referring now to Fig. 1, there is shown a portion of a multisection mechanical filter 15 and a lossy line termination denoted generally by the reference character 17 secured thereto in accordance with the present invention. The filter 15 itself consists of several halfwave resonators 19 coupled to one another by thin necks 21. The end resonator 23 is a half wavelength long at the mean operating frequency. The mechanical impedance which the filter should see attached to the end of the end resonator 23 is the same as the impedance of a neck section 21.

The impedance of a mechanical resonator or a plurality of such resonators forming a filter or other electromechanical circuit elements may vary widely over a desired operating range. Depending upon the particular application to which the resonating system is to be adapted and the impedance versus frequency curve of such a system, the value of impedance of a mechanical damping device may be equal to, less than, or greater than the impedance seen by the resonating system at the center of the desired passband.

Secured to each end resonator 23 is the lossy line damping device 17 of this invention. This damping device is composed of a finite piece of line 25 which need not of itself have very much mechanical loss. For convenience in matching the impedance of mechanical filters having resonators composed of steel, nickel-iron alloys, ferrites, nickel and other metals, this finite piece of mechanical line of low vibratory loss may be made of copper, brass, steel, or similar metals. A coating of material 27 which has a high acoustic or vibratory loss is placed over the greater portion of the length of the line to absorb and damp the mechanical vibrations therein.

Types of coating material 27 which may be used to provide the high vibratory loss for the line 25 include latex, synthetic rubber compounds such as neoprene, silicone rubber compounds, viscous tapes, and rubber compounds impregnated with small pieces of tungsten. For uses where low temperatures only are to be encountered, heavy greases such as pretroleum jelly may be employed.

Other plastic and viscous materials may be used as lossy coating materials, such as polymerized organic compounds, an example of which is polyvinyl acetate. Even metals which have a high acoustic loss, such as lead, tin and zinc, can be used, but generally require a longer length of mechanical line 25 since such coating materials have a lower loss per unit length than the compounds above-mentioned.

The terminating lossy line 17 shown in Fig. 1 is coiled into a helical shape. In this configuration, the termination is best adapted to be used in connection with mechanical resonators vibrating longitudinally or in torsion. The terminating lossy line 17 may be straight, curved, coiled or spiraled. Ideally, of course, due to the fact that the velocity of propagation of compression waves in the material depends on the density of the material, a lossy line made from a piece of stock originally straight, should be straight in its final form. In practice, however, it has been found that various other configurations may be used with the advantage that they occupy much less space; and bends are not detrimental as long as the radius of curvature is not too small for the wavelength being propagated. Two other arrangements will be described below with reference to Figs. 6 and 7.

In Fig. 2, which is a cross section taken along the line 2—2 of Fig. 1, the relation of the piece of mechanical line 25 to the lossy material coating 27 is illustrated in greater detail. It will be noted that adjacent turns of the helix may be very close together. The lossy material 27 completely surrounds the line 25 and acts to damp surface vibrations appearing therealong.

Fig. 3 is a schematic circuit diagram of two electrical circuits coupled together by a mechanical filter which is terminated with the lossy line of this invention. An input amplifier discharge device 31 has coupled thereto a resonant output circuit including a coil 33 and a tuning capacitor 35. The coil 33 electromagnetically couples to an end resonator 23 to produce vibrations in the resonator 23 by magnetostriction according to the currents flowing in the coil 33. For magnetostrictive coupling, the end resonator 23 must be of magnetostrictive material such as nickel, ferrites (sometimes referred to as ferro-spinels), and nickel-iron alloys, and have a magnetic biasing flux passing therethrough. The magnetic biasing flux may be parallel to an axis of the resonator or follow a circular path, depending upon the desired mode of vibration of the resonator. Such a magnetic biasing flux may be applied by means of a permanent magnet, a direct current component through the coupling coil 33, a separate magnetizing winding or coil, or the resonator itself may be permanently magnetized.

A plurality of intermediate resonators 19 joined by necks 21, together with the end resonators 23, 23′, form the mechanical filter. The filter is terminated according to this invention by attaching a lossy line 17 to each of the end resonators 23, 23′. The output end resonator 23′ is magnetostrictively coupled to an output coil 37 which, together with a tuning capacitor 39, forms a resonant input circuit for an output amplifier discharge device 41. In the circuit arrangement shown in this figure, the filtered output 43 is shown taken across a cathode load resistor 45. The output may, of course, be taken across a plate load resistor 47 in the usual manner.

Fig. 4 shows the response curve for a seven-section mechanical filter like that shown in Fig. 3 without any mechanical termination. It will be noted that the response over a frequency range of about 99 to 106 kilocycles includes a number of peaks of very high resonance and several low points occurring in the middle of the desired passband.

Fig. 5 illustrates the response curve of the same mechanical resonator over substantially the same frequency range, but now properly terminated by the lossy line of this invention. The very high peaks and valleys within the passband have been eliminated and the response of the filter smoothed out to provide very steep sides and a substantially flat top response curve. The value of mechanical impedance of the lossy line 17 was selected to match the mechanical impedance seen by the filter at two spaced points in the passband, indicated by the dashed lines 51, 51′. Such a matching procedure is called a compromise termination. With the particular type of filter construction from which the curves of Figs. 4 and 5 were taken, it was found that a mechanical impedance for the lossy line of 70 percent of the midband mechanical impedance seen by the filter was satisfactory. By selecting the impedance of the lossy lines to be the same as the impedance of the coupling necks 21 of Figs. 1 and 3, the center portion of the passband can be made very flat, but more mechanical reflection disturbance occurs at the edges.

In Fig. 6 there is shown an alternative arrangement for the terminating lossy line of this invention. A lossy line 17′ is attached to each end resonator 23″ of a four-section mechanical filter composed of two intermediate resonators 19′ joined by coupling necks 21′. The terminating lossy line 17′ is curved back upon itself so that the lossy material coating 27 may cover sufficient area of the mechanical line 25′ to properly damp the vibrations therealong. This coating of lossy material may be the same as that used for lossy line 17 of Figs. 1 and 2.

In Fig. 7 there is shown another alternative arrangement for this type of lossy line. Two lossy lines 17″ and 17″ having a spiral form are utilized, both coupled to a single end resonator 23 like that shown in connection with Fig. 1 above. Where two such lossy lines 17″, 17″ are joined to the same end resonator 23, the characteristic mechanical impedance of each of the two lines would be half that required of a single line. Each of the mechanical lines 25″, 25″, of course, will be covered with the lossy material 27 over practically their entire length.

It should be noted that where two such lossy lines 17″ are used to terminate a resonator 23, the ratio of the exposed surface to the volume of the mechanical lines 25″ is increased. This has the effect of increasing the amount of attenuation per unit length of both sides of the mechanical line 25″ for a given coating. More than two such lines 25″ may be used, in which case each line would be coated with lossy material 27.

It is desirable in some instances to have the thickness of the lossy material tapered to a thinner thickness near the point of connection to an end resonator 23, 23′, or 23″ in Figs. 1, 6 and 7 above, as shown in Figs. 6 and 7. Such tapering of the coating of the lossy material 27 obviates difficulties arising from the lossy coating 27 affecting the mechanical impedance of the lossy lines 17, 17′, 17″.

The lossy coating 27 may be made thicker and thicker along the mechanical line 25, 25′ or 25″ as the distance increases away from the end resonator 23, 23′, or 23″. As the vibrations appearing at the surface of the mechanical line 25 become more and more damped out as they pass along the lossy line, any reflection effect produced by the coating becomes less and less.

Instead of tapering the coating of lossy material, the mechanical line 25 may be itself tapered. This modification is shown in Fig. 8 wherein a resonator 23 has coupled thereto a tapered mechanical line 25‴, with a uniform thickness of lossy coating material 27 like that described above with respect to Figs. 1, 2, 6 and 7.

This tapering shown in Fig. 8 produces a change in mechanical impedance of the mechanical line 25‴ in proportion to the change in cross-sectional area of the line 25‴. If a very slow rate of taper is used on the mechanical line 25‴, no appreciable reflections will be caused by the change in mechanical impedance of the lossy line. This has the result that with a coating material of constant thickness, the attenuation per unit length of line increases away from the end resonator because the ratio of surface-to-volume per unit length of line increases as the diameter of the mechanical line 25 is reduced.

Fig. 9 is an alternative arrangement of lossy lines according to this invention consisting of two strands 26 and 26′ having a finite length. According to the modification shown in this figure, one strand 26 is ¼ wavelength shorter at the midband frequency than the other strand 26′. This arrangement has the advantage that if there is any mechanical reflection from the end of either of the finite strands 26 or 26′, this reflection will be cancelled out upon return from the end of the line. The same lossy coating materials discussed above in conjunction with Fig. 1 are utilized to cover the exposed surface of the mechanical lines 26 and 26′ to provide the losses therein.

As mentioned above in connection with Fig. 7, more than two strands may comprise the lossy line 17 shown in Fig. 9. In the arrangement shown in Fig. 9, however, to achieve the advantage of cancelling out the reflections from the end of the finite strands 26 or 26′, an even number of strands must be used. One half of the strands 26 will be ¼ wavelength shorter at the midband frequency than the other half of the strands 26′.

In accordance with one embodiment of this invention successfully tried out in practice, a lossy line was used to terminate a bandpass mechanical filter centered around 100 kc. The filter itself was a seven-section filter having five intermediate resonators 19 made of a nickel, iron, chromium alloy known under the trade name of Ni-Span C. Each resonator was a half wavelength for the longitudinal mode of vibration and was 0.945 inch long and 0.250 inch in diameter. The coupling necks 21 were 0.055 inch in diameter and had an effective length of ¼ wavelength at midband frequency which was a linear dimension of 0.505 inch between resonators. The coupling necks 21 were press fitted and hard soldered into holes in the resonators. The end resonators 23 had the same length as the intermediate resonators 19, but had a diameter of 0.177 inch to act as terminating half-wave sections having half the mechanical impedance of the intermediate resonators 19. The end resonators were made of the same material as the intermediate resonators 19, and were magnetically biased by means of a permanent magnet.

The lossy line termination was five feet of 0.050 inch copper wire coiled into a helix having an inside diameter of ⅞ inch and dip-coated with two layers of self-vulcanizing liquid latex. The lossy lines themselves were soft soldered into the end resonators of the filter giving the physical appearance shown in Fig. 1 of the drawings.

When the filter was operated in the circuit arrangement of Fig. 3, the input amplifier device 31 was a type 6BJ6 pentode amplifier vacuum tube; and the output amplifier device 41 was a type 6J6 dual triode vacuum tube with both sets of electrodes of the triode connected in electrically parallel relationship. In the circuit arrangement shown, the insertion loss of the filter measured about 8 decibels from the grid of the input amplifier device 31 to the grid of the output amplifier device 41. The loss occurring in the circuit within the passband is not due so much to the mechanical filter itself, but mainly due to the inefficient coupling between the input coil 33 and the first end resonator 23 as well as the second end resonator 23' and the output coil 37.

By using magnetostrictive ferrite, sometimes referred to as ferro-spinel, for the input and output resonators 23 and 23', much higher efficiency can be obtained. A piezo-electric driving system can also be used to provide efficient electrical-to-mechanical conversion at the input and output. A suitable piezo-electric substance for this use is barium titanate. The manner of transferring the mechanical energy from a piezo-electric driving device depends upon the mode of vibration desired in the mechanical resonator. For example, for longitudinal vibration, the driving device would be secured to one end of the mechanical resonator and excited by an electric circuit in a manner well understood in the art.

If a high efficiency magnetostrictive transducer or piezo-electric driving system is used for the electrical-to-mechanical conversion at the input and output, less mechanical damping will be required than that in the specific arrangement described above. The mechanical damping in this case furnishes only enough vibratory loss to make up for the deficiency of electrical damping in the conversion from mechanical to electrical energy.

What is claimed is:

1. A damping termination for a mechanical filter having at least one mechanical resonator tuned to the frequency of operation of said filter, comprising a lossy mechanical line mechanically coupled to said resonator, said line having a central portion of low vibratory loss and a coating of latex on said mechanical line, the combined thickness of said line and said coating being less than the thickness of said resonator, said lossy line being coiled in the form of a helix.

2. A mechanical filter construction comprising a plurality of mechanical resonators tuned to the same frequency and mechanically coupled together in cascade, a metallic terminating line extending from a terminal one of said resonators at a point of maximum motion therein, and a coating of lossy material on the surface of said line over a major portion of the length thereof, the combined thickness of said terminating line and coating being appreciably less than the thickness of said mechanical resonators.

3. A mechanical filter as defined in claim 2 wherein said line is in the form of a coil.

4. A mechanical filter as defined in claim 2 wherein said line is in the form of a helix.

5. A mechanical filter construction comprising a plurality of cylindrical mechanical resonators tuned to the same frequency, coupling necks mechanically coupling said resonators coaxially in cascade, a metallic terminating line extending coaxially from a terminal one of said resonators in cascade and thereafter curved to conserve space, and a coating of lossy plastic material on said line over the major portion of its length.

6. A mechanical filter construction comprising a plurality of cylindrical mechanical resonators tuned to the same frequency, coupling necks mechanically coupling said resonators coaxially in cascade, a metallic terminating line extending from a terminal one of said resonators in cascade, the major portion of said line being in the form of a helix disposed with its axis at right angles with the axis of said resonators, and a coating of lossy plastic material on said line.

7. The combination of a mechanical filter having a resonator, said resonator being tuned to the frequency of operation of said filter, means mechanically coupled to one end of said resonator and presenting a mechanical impedance thereto at said frequency of operation of said resonator, a metallic line mechanically coupled to the other end of said resonator and presenting substantially the same said mechanical impedance thereto, and a coating of lossy material on said line over a major portion of its length.

8. A mechanical band pass filter comprising a plurality of resonators mechanically coupled together by coupling necks of lesser thickness than said resonators, a metallic terminating line of appreciable length mechanically coupled to an end resonator, said line having a thickness substantially equal to the thickness of said necks, and a coating of lossy material on said line extending over substantially its entire length.

9. A mechanical filter, comprising a plurality of mechanical resonators tuned to the same frequency and mechanically coupled together in cascade, a metallic terminating line extending from each of said terminating resonators of said cascade at a point of maximum motion therein, each of said terminating lines being curved back on itself to conserve space, and a coating of lossy material on the surface of each of said lines over a major portion of the length thereof, the combined thickness of each of said terminating lines and its respective coating being appreciably less than the thickness of said mechanical resonators.

10. A mechanical filter, comprising a plurality of mechanical resonators tuned to the same frequency and mechanically coupled together in cascade, a pair of metallic terminating lines extending from each of said terminal resonators of said cascade at a point of maximum motion therein, each of said terminating lines of each of said pairs being curved in a spiral, and a coating of lossy material on the surface of each of said terminating lines over a major portion of the length thereof.

11. A mechanical filter, comprising a plurality of mechanical resonators tuned to the same frequency and mechanically coupled together in cascade, a metallic terminating line extending from a terminal one of said resonators at a point of maximum motion therein, said terminating line being tapered from a maximum thickness at said terminal resonator to a minimum thickness at its end, and a coating of lossy material on the surface of said line over a major portion of the length thereof, the combined thickness of said terminating line and said coating being appreciably less than the thickness of said mechanical resonators.

12. A mechanical filter, comprising a plurality of mechanical resonators tuned to the same frequency and mechanically coupled together in cascade, a plurality of substantially parallel metallic terminating lines extending from each of said terminal resonators of said cascade at a point of maximum motion therein, and a coating of lossy material on the surface of each of said terminating lines over a major portion of the lengths thereof, the combined thickness of each of said terminating lines and its respective coating being appreciably less than the thickness of said mechanical resonators.

13. A mechanical filter, comprising a plurality of mechanical resonators tuned to the same frequency and mechanically coupled together in cascade, a plurality of substantially parallel metallic terminating lines extending from each of said terminal resonators at a point of maximum motion therein, each of said pluralities of terminating lines being an even number of said terminating lines, half of which are one-quarter wavelength longer than the other half at said frequency, and a coating of lossy material on the surface of each of said terminating lines over a major portion of the lengths thereof, the combined thickness of each of said terminating lines and its respective coating being appreciably less than the thickness of said mechanical resonators.

14. A mechanical filter, comprising a plurality of mechanical resonators tuned to the same frequency and mechanically coupled together in cascade, a metallic terminating line extending from a terminal one of said resonators at a point of maximum motion therein, and a coating of lossy material on the surface of said terminating line over a major portion of the length thereof, said coating being tapered so that it has a minimum thickness at said terminal resonator, the combined thickness of said terminating line and said coating being appreciably less than the thickness of said mechanical resonators.

15. A mechanical filter construction comprising a mechanical resonator, a metallic terminating line extending from said resonator at a point of maximum motion therein, and a coating of lossy material on the surface of said line over a major portion of the length thereof, the combined thickness of said terminating line and coating being appreciably less than the thickness of said mechanical resonator.

References Cited in the file of this patent

UNITED STATES PATENTS

| | | |
|---|---|---|
| 1,654,123 | Hartley | Dec. 27, 1927 |
| 1,852,795 | Wegel | Apr. 5, 1932 |
| 2,210,415 | Kellogg | Aug. 6, 1940 |
| 2,401,094 | Nicholson | May 28, 1946 |
| 2,549,578 | Curtis | Apr. 17, 1951 |
| 2,559,905 | Turner | July 10, 1951 |
| 2,577,500 | Arenberg | Dec. 4, 1951 |
| 2,578,452 | Roberts | Dec. 11, 1951 |
| 2,652,542 | Anthony et al. | Sept. 15, 1953 |

OTHER REFERENCES

Metz et al.: Electronics, July 1949, pages 96–100. (Copy in 333–30.)